United States Patent Office

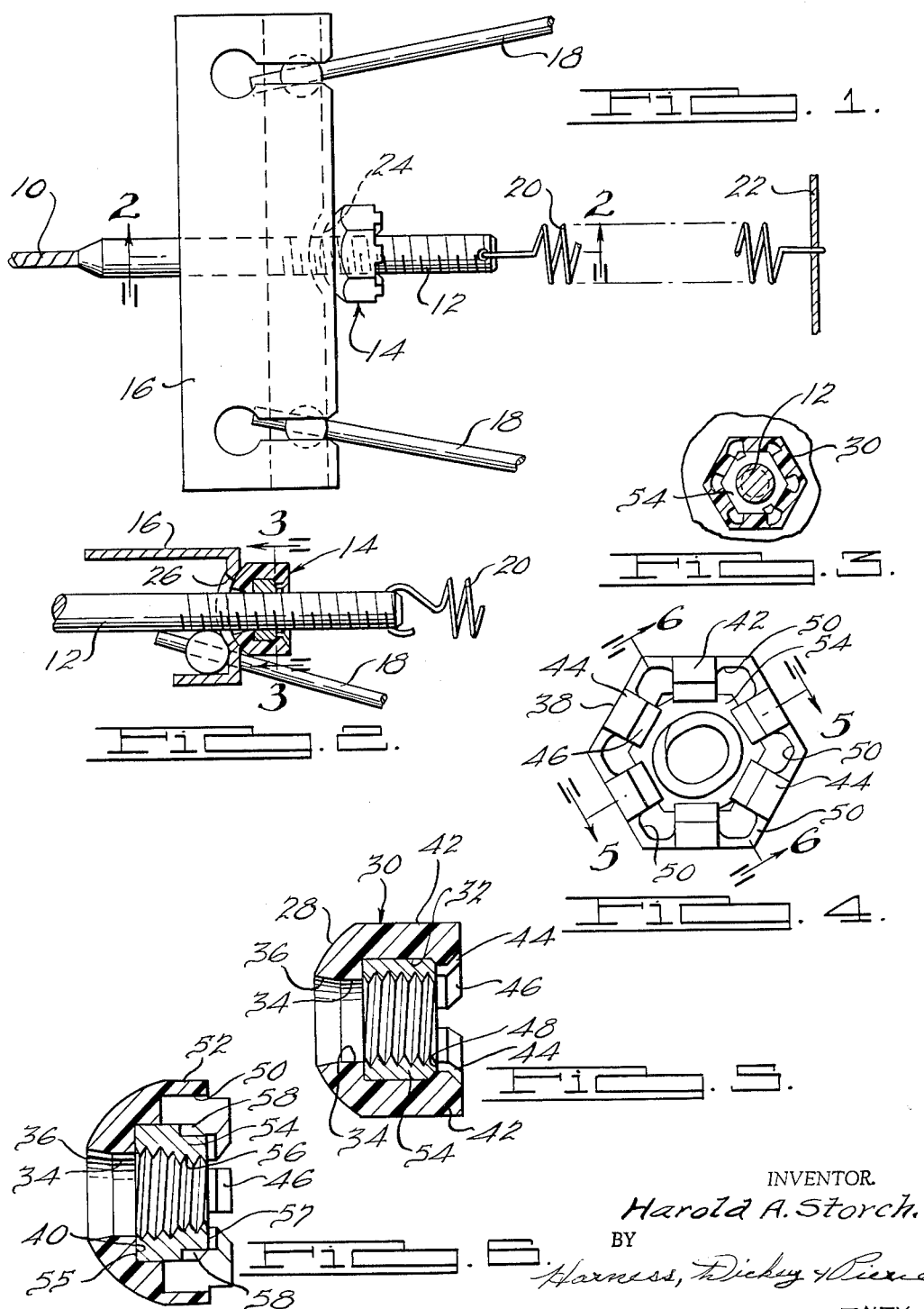

3,262,480
Patented July 26, 1966

3,262,480
NUT ENCLOSED IN PLASTIC BEARING MEMBER
Harold A. Storch, Birmingham, Mich., assignor to Federal Screw Works, Detroit, Mich., a corporation of Michigan
Filed Apr. 10, 1964, Ser. No. 358,734
3 Claims. (Cl. 151—7)

This invention relates to fasteners and particularly to a combined nut and molded plastic member enclosing the nut.

It is an object of the present invention to provide a nut assembly including a non-metallic bearing member united with a metal nut wherein the bearing renders the nut readily movable or adjustable with respect to the adjacent structure fastened by the nut.

It is another object of the present invention to provide a holder for a nut adapted to enclose the nut and maintain the nut in association therewith.

It is another object of the present invention to provide a nut assembly for use in an angular joint in which the forces transmitted between the nut and adjacent structure are equally distributed over the bearing surface of a bearing member united with the nut irrespective of the inclination of the nut with respect to such adjacent structure.

It is still another object of the present invention to provide an assembly consisting of a nut and a molded plastic member having a socket for receiving the nut in which the molded plastic member grips the threads of the male threaded member onto which the nut assembly is threaded to assist in preventing rotation of the nut on the male threaded member.

It is still another object of the present invention to provide a nut assembly of the above character which is easily assembled, which is of low cost, which is of sturdy, long-lasting construction, which reduces the fatiguing, stressing, fretting, and wear of the metal threads, which dampens vibration, and which eliminates rattling between the nut and its adjacent parts.

These and other objects of the present invention will be obvious from the following detailed description, taken in conjunction with the accompanying drawings, wherein:

FIGURE 1 is a view of a parking brake linkage incorporating a nut assembly of the present invention;

FIG. 2 is a sectional view of the structure illustrated in FIG. 1 taken along the line 2—2 thereof;

FIG. 3 is a sectional view of the structure illustrated in FIG. 2 taken along the line 3—3 thereof;

FIG. 4 is an enlarged plan view of the nut assembly shown in FIGS. 1–3;

FIG. 5 is a sectional view of the structure shown in FIG. 4 taken along the line 5—5 thereof; and FIG. 6 is a sectional view of the structure illustrated in FIG. 4 taken on the line 6—6 thereof.

Referring now to the drawings, FIGURE 1 illustrates environmental structure with which the nut assembly of the present invention may be used. Such associated structure includes a fragmentarily illustrated parking brake cable which extends longitudinally of a passenger car and is adapted to be pulled at its forward end by any suitable force-applying means, such as the usual foot operated parking brake lever (not shown). The cable 10 is affixed at its rear end to a male threaded equalizer rod 12. A nut assembly 14, made according to the present invention, is threaded on to the equalizer rod 12 and serves to retain an equalizer bracket 16 thereon. The bracket 16 extends transversely of the vehicle and receives the rod 12 through its mid length. The opposite ends of the bracket are connected to a pair of rear brake cables 18, which fasten at their rear ends to mechanical operating means of the rear brakes of the car (not shown). Cable operated parking brakes associated with vehicle wheels are well known in the art and no detailed description of the same is required. The parking brake structure illustrated herein merely represents one possible application of the nut assembly, it being understood that the nut assembly may have a variety of other uses in other environments. In the particular brake application illustrated, however, a spring 20 is illustrated connecting the rear end of the rod 12 to a fixed portion 22 of the vehicle frame to maintain the cable 10 in a taut condition and to provide for retraction of the rear parking brake cables 18.

The equalizer bracket 16 will be seen to be provided with a segmentally spherical depression 24 on the rearwardly facing side thereof surrounding a bracket opening 26 through which the rod 12 passes. The depression 24 forms a seat for engagement by the segmentally spherical surface 28 of a molded synthetic resinous plastic body or bearing member 30. The member 30 may also be termed a nut holder, depending upon which function of the member 30 it is desired to emphasize. In the environment illustrated herein the member 30 primarily serves a bearing function. The bearing member or body 30 is formed with a central socket or cavity 32 of hexagonal cross sectional shape. The cavity 32 is open to one end of the member 30 through a coaxial opening or bore 34 having an outwardly tapered mouth 36. Except for the portion of the body 30 within the length of the bearing surface 28, the body will be seen to be of hexagonal cross section and is provided with wrench-receiving flats 38. The socket 32 is defined in part by an annular bottom wall 40 surrounding the bore 34 and by the inner sides of a plurality of resilient arms 42, each of which is in radial alignment with the center of one of the flat 38.

Each of the arms 42 has a radially inwardly extending finger or projection 44 provided with an inclined cam surface 46 on the outer surface thereof. The cam surface 46 serves a function in the assembly of the parts as will be explained more fully hereinafter. Each of the projections 44 provides an abutment surface or shoulder 48 on its inner side which serves a nut-retaining function. As may be seen in FIGS. 3 and 6, the surfaces defining the socket 32 are recessed at locations 50 between each pair of arms 42. This affords a greater degree of resiliency to the arms to facilitate their radially in and out flexure. It will thus be seen that an enclosing wall 52 of the body member 30 is of relatively thin cross section in locations adjacent the recessed areas 50.

The bearing member 30 serves to receive and enclose a nut 54 which is substantially of the configuration of a common "hex nut." The nut 54 will be seen to have a central threaded bore 56 coaxial with the bore 34 of the bearing member 30 and it is of outwardly hexagonal cross sectional shape to fit matingly within the socket 32. One end wall 55 of the nut seats against the annular bottom wall 40 of the socket 32 while the opposite end wall 57 of the nut is contacted by the abutment surfaces or shoulders 48 of the fingers 44. The nut 54 differs from a common hex nut only in that it is desirably a "prevailing torque" lock nut. While a variety of different lock nuts may be utilized, the particular lock nut illustrated herein is of the type disclosed in my copending application, Serial No. 168,069, filed January 23, 1962, entitled "Lock Nut Indented at the Corners," now Patent No. 3,171,459. This particular lock nut has indentations 58 which, when formed, define inwardly displaced thread areas adjacent thereto and distort one end of the bore 56 to oval shape. Accordingly, when the nut is threaded onto the rod 12, portions of the threads of the bore 56 opposite the indentations 58 will grip the rod threads of the rod requiring the application of a substantial amount of torque to produce rotation of the nut on the rod 12.

In the assembly of the nut 54 to the bearing member 30, the nut is placed on the member 30 so that the edges of the end wall 54 of the nut contact the cam surfaces 46. The nut is then forced into the cavity 32 (preferably in a press), and the flexible fingers 42 will be deflected radially outwardly to permit the nut to move past the radially inner ends of the fingers 44 and into the socket 32. When the nut is fully seated in the socket 32 the fingers 44 and the arms 42 will spring back so that the shoulders 48 will lie over the end wall 56 of the nut and prevent the nut from coming out of the socket 32.

The nut assembly 14 is threaded onto the rod 12 from the rear end thereof to which the spring 20 is subsequently attached. The tapering mouth 36 of the bore 34 provides a "lead-in" to direct the rod 12 into the bore 34. The bore 34 is of a diameter equal to the pitch diameter of the threads of the nut bore 56. For this reason the threads of the rod 12 form threads in the bore 34 as the nut assembly 14 is threaded onto the rod. In other words, the material of the member 30 defining the bore 34 is displaced radially inwardly by the rod 12 and grips the rod. The bearing member 30 is preferably made from nylon or other readily deformable plastic material. Accordingly, no difficulty is experienced in threading the rod 12 through the bore 34. From the foregoing, it will be appreciated that the member 30 assists the deformed thread portions of the lock nut 54 in preventing rotation of the nut assembly 14 on the rod 12.

In the particular environment illustrated herein, the nut assembly 14 permits the equalizer bracket 16 to move angularly with respect to the equalizer rod 12, thus assuring that the force applied to the cable 10 will be equally distributed between the rear brake cables 18. It will also be apparent that the bearing member 30 will reduce the incidence of rattle between the parts of the joint to a negligible amount. Also, the fact that the bearing 30 grips the threads of the rod 12, helps stabilize the nut 54 on the rod 12 and reduces the degree of fretting and wear on the threads of the nut. Furthermore, inclination of the bracket 16 relative to the rod 12 will not tend to cock the nut 54 on the rod 12. It is also to be appreciated that the nut assembly 14 is readily identifiable from the standpoint of determining which end is to be applied to the rod first. Accordingly, there is no chance of the nut assembly being accidentally applied backwards to the rod 12.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In combination with a member having a concave apertured recess and a male threaded member passing through said recess, a nut assembly including a metallic nut body having a threaded bore threadedly engaging said male threaded member and an outer periphery of regular polygonal cross section, a synthetic resinous bearing member having a central cavity of a cross-sectional shape closely fitting the outer periphery of said nut body, said nut body and said cavity being of polygonal cross section, said cavity being open at the opposite ends of said bearing member, a convex outer surface on one end of said bearing member slidably engaging in said concave recess with the diameter of the opening at said one end being less than the minimum external transverse dimension of said nut body, said recess and said convex end surface being of substantially segmentally spherical shape and at least two circumferentially spaced resilient fingers on said bearing member projecting radially inwardly at the other end of said cavity and confining said nut body in said cavity, said fingers having cam surfaces on the outer sides thereof tapering inwardly toward said cavity, said cam surfaces being engageable by said nut body to cause said fingers to deflect radially outwardly out of alignment with said cavity and permit said nut body to be pressed into said cavity.

2. In combination with a member having a concave apertured recess and a male threaded member passing through said recess, a nut assembly including a metallic nut body having a threaded bore threadably engaging said male threaded member and an outer periphery of regular hexagonal cross section, a synthetic resinous bearing member having a central cavity of a cross-sectional shape closely fitting the outer periphery of said nut body, said nut body and said cavity being of hexagonal cross section, said cavity being open at the opposite ends of said bearing member, a convex outer surface on one end of said bearing member slidably engaging in said concave recess with the diameter of the opening at said one end being less than the minimum external transverse dimension of said nut body, said recess and said convex end surface being of substantially segmentally spherical shape and six circumferentially spaced resilient fingers on said bearing member projecting radially inwardly at the other end of said cavity and nonrotatably confining said nut body in said cavity, said fingers having cam surfaces on the outer sides thereof tapering inwardly toward said cavity, said cam surfaces being engageable by said nut body to cause said fingers to deflect radially outwardly out of alignment with said cavity and permit said nut body to be pressed into said cavity.

3. In an automobile parking brake actuating linkage, a cable adapted to be pulled for applying the brakes, a threaded rod at the end of said cable, a bracket extending transversely of said threaded rod and having an apertured concave recess facing away from the direction from which said cable is pulled, said threaded rod being projected through said apertured recess, a pair of brake actuating members connected to said bracket on opposite sides of said recess whereby when said bracket is pulled by a force at said recess said brake actuating members will be pulled with substantially equal forces, a nut body having a threaded bore threadably engaging the thread of said male threaded member and an outer periphery of regular polygonal cross section, a synthetic resinous bearing member having a central cavity of a cross sectional shape closely fitting the outer periphery of said nut body, said cavity being open at the opposite ends thereof, a convex outer surface at one end of said bearing member slidably engageable in said concave recess and at least one resilient finger at the other end of said bearing member projecting radially inwardly with respect to said cavity and operable to tightly confine said nut body in said cavity, said finger being operable to spring out of alignment with said cavity to permit said nut body to be pressed into said cavity from the end thereof opposite said bearing surface.

References Cited by the Examiner

UNITED STATES PATENTS

| | | | |
|---|---|---|---|
| 1,630,075 | 5/1927 | Ross | 151—41.7 |
| 1,632,418 | 6/1927 | Ruegg | 151—7 |
| 2,391,643 | 12/1945 | Reutter | 151—7 |
| 2,585,728 | 2/1952 | Bedford | 151—41.75 |
| 2,824,465 | 2/1958 | Riley | 151—41.75 |
| 2,850,064 | 9/1958 | Rapata | 151—7 |
| 2,854,099 | 9/1958 | Damon | 151—27 |
| 2,912,072 | 11/1959 | Jones | 188—204 |
| 3,171,459 | 3/1965 | Storch. | |

FOREIGN PATENTS

| | | |
|---|---|---|
| 1,245,743 | 10/1960 | France. |
| 665,544 | 1/1952 | Great Britain. |

CARL W. TOMLIN, *Primary Examiner.*

R. S. BRITTS, *Assistant Examiner.*